(12) United States Patent
Lu et al.

(10) Patent No.: US 11,545,484 B2
(45) Date of Patent: Jan. 3, 2023

(54) METHOD OF DUMMY PATTERN LAYOUT

(71) Applicant: United Microelectronics Corp., Hsinchu (TW)

(72) Inventors: Jui-Fa Lu, Tainan (TW); Chien-Nan Lin, Hsinchu (TW); Ching-Hua Yeh, Tainan (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 115 days.

(21) Appl. No.: 17/150,960

(22) Filed: Jan. 15, 2021

(65) Prior Publication Data

US 2021/0134790 A1 May 6, 2021

Related U.S. Application Data

(62) Division of application No. 15/705,026, filed on Sep. 14, 2017, now Pat. No. 10,964,689.

(30) Foreign Application Priority Data

Aug. 17, 2017 (CN) .......................... 201710706341.4

(51) Int. Cl.
*H01L 27/06* (2006.01)
*H01L 29/06* (2006.01)
(Continued)

(52) U.S. Cl.
CPC .......... *H01L 27/0629* (2013.01); *G06F 30/39* (2020.01); *G06F 30/392* (2020.01);
(Continued)

(58) Field of Classification Search
CPC ................. H01L 27/0629; H01L 28/24; H01L 2924/00014; H01L 29/66545; H01L 21/823431
See application file for complete search history.

(56) References Cited

U.S. PATENT DOCUMENTS

| 8,022,550 B2 | 9/2011 | Koubuchi et al. |
| 8,237,227 B2 | 8/2012 | Lai et al. |

(Continued)

FOREIGN PATENT DOCUMENTS

| CN | 101661933 | 3/2010 |
| CN | 102822957 | 12/2012 |
| CN | 105826242 | 8/2016 |

OTHER PUBLICATIONS

"Office Action of China Counterpart Application", dated May 31, 2021, p. 1-p. 12.

(Continued)

*Primary Examiner* — Marcos D. Pizarro
*Assistant Examiner* — Quinton A Brasfield
(74) *Attorney, Agent, or Firm* — J.C. Patents

(57) ABSTRACT

A design method of a dummy pattern layout including the following steps is provided. An integrated circuit layout design including resistor elements is obtained via a computer. The locations of dummy conductive structures are configured, wherein the dummy conductive structures are aligned with the resistor elements. The locations of dummy support patterns are configured, wherein each of the dummy support patterns is configured between two adjacent dummy conductive structures, and each of the dummy conductive structures is equidistant from the dummy support patterns on both sides.

7 Claims, 4 Drawing Sheets

(51) Int. Cl.
  *H01L 29/49*   (2006.01)
  *H01L 23/528*  (2006.01)
  *H01L 29/66*   (2006.01)
  *H01L 23/532*  (2006.01)
  *H01L 49/02*   (2006.01)
  *H01L 23/522*  (2006.01)
  *G06F 30/39*   (2020.01)
  *G06F 30/392*  (2020.01)
  *G06F 119/18*  (2020.01)

(52) U.S. Cl.
  CPC ........ *H01L 23/528* (2013.01); *H01L 23/5228* (2013.01); *H01L 23/53257* (2013.01); *H01L 28/20* (2013.01); *H01L 29/0649* (2013.01); *H01L 29/4966* (2013.01); *H01L 29/66545* (2013.01); *G06F 2119/18* (2020.01)

(56) References Cited

U.S. PATENT DOCUMENTS

| | | |
|---|---|---|
| 8,860,181 B2 | 10/2014 | Wei et al. |
| 9,240,403 B2 | 1/2016 | Hung et al. |
| 2005/0012153 A1* | 1/2005 | Ipposhi ............... H01L 21/84 257/E21.703 |
| 2009/0051008 A1* | 2/2009 | Shin ................ H01L 27/0629 257/536 |
| 2010/0320544 A1 | 12/2010 | Tseng et al. |
| 2012/0228690 A1 | 9/2012 | Maeda et al. |
| 2013/0234292 A1 | 9/2013 | Wei et al. |
| 2013/0277754 A1* | 10/2013 | Liang ............... H01L 27/0629 257/379 |
| 2014/0099768 A1 | 4/2014 | Choi et al. |
| 2014/0246730 A1 | 9/2014 | Hung et al. |
| 2016/0204100 A1 | 7/2016 | Zhang et al. |
| 2018/0130796 A1 | 5/2018 | Jun et al. |
| 2018/0190754 A1* | 7/2018 | Lin ................. H01L 21/32051 |

OTHER PUBLICATIONS

"Office Action of China Counterpart Application", dated Dec. 30, 2020, p. 1-p. 13.

* cited by examiner

METHOD OF DUMMY PATTERN LAYOUT

CROSS REFERENCE TO RELATED APPLICATION

This application is a divisional application of and claims the priority benefit of U.S. application Ser. No. 15/705,026, filed on Sep. 14, 2017, now allowed, which claims the priority benefit of China application serial no. 201710706341.4, filed on Aug. 17, 2017. The entirety of each of the above-mentioned patent applications is hereby incorporated by reference herein and made a part of specification.

BACKGROUND OF THE INVENTION

Field of the Invention

The invention relates to a semiconductor structure and a design method of a layout, and more particularly, to a semiconductor structure having a dummy pattern and a design method of a dummy pattern layout.

Description of Related Art

A semiconductor structure has regions with lower pattern densities, and dummy patterns are generally used in the regions with lower pattern densities (hereinafter low pattern density regions) to compensate portions with insufficient pattern densities. For instance, in the low pattern density regions, dummy conductive structures are disposed on the isolation structures to compensate the portions of the conductive structures with insufficient pattern densities.

However, when dishing phenomenon occurs to the isolation structures in the low pattern density regions, the conductive material for forming the dummy conductive structures remains in the low pattern density regions such that bridging occurs to the dummy conductive structures in the low pattern density regions and the conductive structures in dense regions, and the electrical performance of the device is reduced as a result.

SUMMARY OF THE INVENTION

The invention provides a semiconductor structure that can prevent bridging to the dummy conductive structures in a low pattern density region and the conductive structures in a dense region to improve the electrical performance of the device.

The invention provides a design method of a dummy pattern layout that can prevent dishing phenomenon to the isolation structures in a low pattern density region.

The invention provides a semiconductor structure including a substrate, dummy conductive structures, and resistor elements. The substrate includes a resistor region and has isolation structures and dummy support patterns located in the resistor region. Each of the isolation structures is located between two adjacent dummy support patterns. Each of the dummy conductive structures is disposed on each of the isolation structures and equidistant from the dummy support patterns on both sides. The resistor elements are disposed above the dummy conductive structures and aligned with the dummy conductive structures.

According to an embodiment of the invention, in the semiconductor structure, the dummy support patterns can be a portion of the substrate.

According to an embodiment of the invention, in the semiconductor structure, the width of the top portion of the dummy support patterns is, for instance, less than the distance between two adjacent dummy conductive structures.

According to an embodiment of the invention, in the semiconductor structure, each of the dummy support patterns is, for instance, located at a central location between two adjacent dummy conductive structures.

According to an embodiment of the invention, in the semiconductor structure, the width of the top portion of the isolation structures is, for instance, greater than the width of the dummy conductive structures.

According to an embodiment of the invention, in the semiconductor structure, the dummy conductive structures are, for instance, dummy metal gate structures or dummy contacts.

According to an embodiment of the invention, in the semiconductor structure, the dummy conductive structure is, for instance, located at the central location of the isolation structure.

According to an embodiment of the invention, in the semiconductor structure, the substrate further includes a dense region. The dense region can be located at one side or two sides of the resistor region.

According to an embodiment of the invention, in the semiconductor structure, the isolation structures can further be disposed in the substrate in the dense region.

According to an embodiment of the invention, in the semiconductor structure, at least one active region can be further included. The active region is located between two adjacent isolation structures in the dense region.

According to an embodiment of the invention, in the semiconductor structure, at least one conductive structure can be further included. The conductive structure is disposed on the substrate between two adjacent isolation structures in the dense region.

According to an embodiment of the invention, in the semiconductor structure, the conductive structure is, for instance, a metal gate structure.

According to an embodiment of the invention, in the semiconductor structure, the resistor elements are, for instance, high-resistance resistors (HIRs).

The invention provides a design method of a dummy pattern layout including the following steps. An integrated circuit layout design including resistor elements is obtained via a computer. The locations of dummy conductive structures are configured, wherein the dummy conductive structures are aligned with the resistor elements. The locations of dummy support patterns are configured, wherein each of the dummy support patterns is configured between two adjacent dummy conductive structures, and each of the dummy conductive structures is equidistant from the dummy support patterns on both sides.

According to an embodiment of the invention, in the design method of the dummy pattern layout, the method of configuring the locations of the dummy support patterns can include the following steps. Empty areas between the dummy conductive structures are selected, wherein the empty areas are areas to be inserted by the dummy support patterns. The dummy support patterns are inserted into the empty areas. The distance between the dummy support patterns and the dummy conductive structures is configured. The distance between the ends of the dummy support patterns is configured.

According to an embodiment of the invention, in the design method of the dummy pattern layout, the width of the dummy support pattern is, for instance, less than the distance between two adjacent dummy conductive structures.

According to an embodiment of the invention, in the design method of the dummy pattern layout, the dummy support pattern is, for instance, located at the central location between two adjacent dummy conductive structures.

According to an embodiment of the invention, in the design method of the dummy pattern layout, the dummy support patterns are, for instance, a portion of the substrate.

According to an embodiment of the invention, in the design method of the dummy pattern layout, the dummy conductive structures are, for instance, dummy metal gate structures or dummy contacts.

According to an embodiment of the invention, in the design method of the dummy pattern layout, the resistor elements are, for instance, HIRs.

Based on the above, in the semiconductor structure provided in the invention, since each of the isolation structures is located between two adjacent dummy support patterns and each of the dummy conductive structures is disposed on each of the isolation structures and equidistant from the dummy support patterns on both sides, dishing phenomenon to the isolation structures in the resistor region can be prevented to prevent undesired conductive material from remaining in the resistor region. Therefore, bridging to the dummy conductive structures in the resistor region and the conductive structures in the dense region can be prevented to improve the electrical performance of the device.

Moreover, in the design method of the dummy pattern layout provided in the invention, by configuring each of the dummy support patterns between two adjacent dummy conductive structures, each of the isolation structures can be located between two adjacent dummy support patterns. Moreover, each of the dummy conductive structures is configured to be equidistant from the dummy support patterns on both sides. Accordingly, dishing phenomenon to the isolation structures in the resistor region can be prevented to prevent undesired conductive material from remaining in the resistor region.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
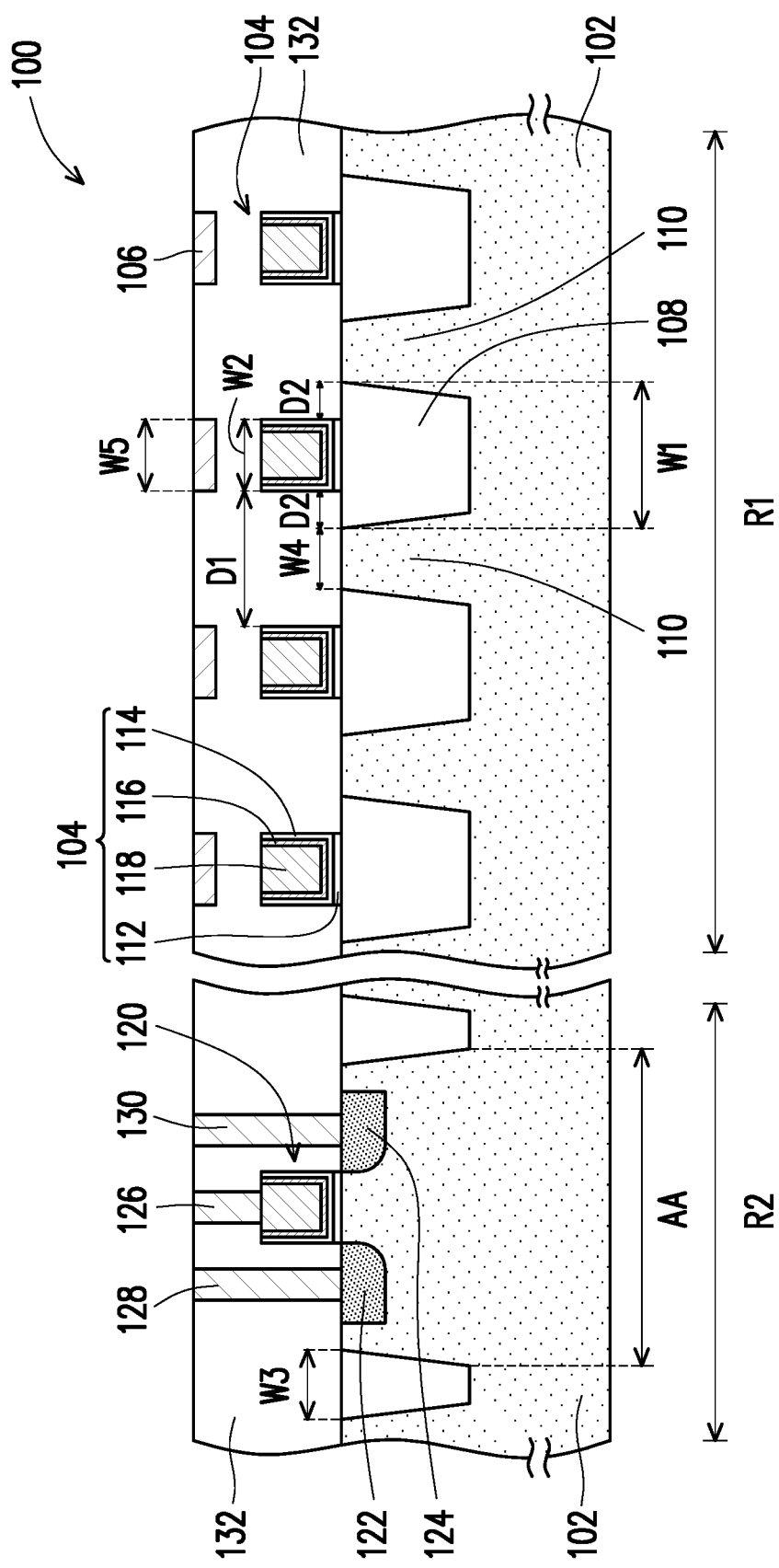
FIG. 1 is a cross section of a semiconductor structure of an embodiment of the invention.

FIG. 1 is a cross section of a semiconductor structure of an embodiment of the invention.

Referring to FIG. 1, a semiconductor structure 100 includes a substrate 102, dummy conductive structures 104, and resistor elements 106. The substrate 102 can be a semiconductor substrate such as a silicon substrate. The substrate 102 includes a resistor region R1, and can further include a dense region R2. The dense region R2 can be located at one side or two sides of the resistor region R1. The resistor region R1 is, for instance, a low pattern density region, and the dense region R2 is, for instance, a high pattern density region. In the present embodiment, the dense region R2 is exemplified by being located at one side of the resistor region R1, but the invention is not limited thereto.

The substrate 102 has isolation structures 108 and dummy support patterns 110 located in the resistor region R1. Each of the isolation structures 108 is located between two adjacent dummy support patterns 110. A width W1 of the top portion of the isolation structures 108 in the resistor region R1 is, for instance, greater than a width W2 of the dummy conductive structures 104. The isolation structures 108 are, for instance, shallow trench isolation (STI) structures. The material of the isolation structures 108 is, for instance, silicon oxide.

In addition to being disposed in the substrate 102 in the resistor region R1, the isolation structures 108 can further be disposed in the substrate 102 in the dense region R2. In the present embodiment, the width W1 of the top portion of the isolation structures 108 in the resistor region R1 is, for instance, greater than a width W3 of the top portion of the isolation structures 108 in the dense region R2, but the invention is not limited thereto.

The dummy support patterns 110 can be a portion of the substrate 102. For instance, the dummy support patterns 110 can be protruding structures formed by removing a portion of the substrate 102. During a chemical mechanical polishing process for forming the isolation structures 108, the dummy support patterns 110 can display a support function to prevent dishing phenomenon to the isolation structures 108 in the resistor region R1.

Moreover, a width W4 of the top portion of the dummy support patterns 110 is, for instance, less than a distance D1 between two adjacent dummy conductive structures 104. The dummy support pattern 110 is, for instance, located at the central location between two adjacent dummy conductive structures 104.

Each of the dummy conductive structures 104 is disposed on each of the isolation structures 108 and equidistant from the dummy support patterns 110 at both sides. That is, the dummy conductive structures 104 can be a same distance D2 from the dummy support patterns 110 on both sides. Each of the dummy conductive structures 104 is, for instance, located at the central location of each of the isolation structures 108. The dummy conductive structures 104 are, for instance, dummy metal gate structures or dummy contacts.

In the present embodiment, the dummy conductive structures 104 are exemplified by dummy metal gate structures, but the invention is not limited thereto. The dummy conductive structures 104 can include a gate dielectric layer 112, a high-k dielectric layer 114, a work function metal layer 116, and a metal gate layer 118 disposed on the isolation structures 108 in order. Moreover, spacers (not shown) can further optionally be disposed on both sides of the metal gate layer 118. The material of the gate dielectric layer 112 is, for instance, silicon oxide. The material of the high-k dielectric layer 114 is, for instance, hafnium oxide ($HfO_2$), aluminum oxide ($Al_2O_3$), yttrium oxide ($Y_2O_3$), zirconium silicon oxide ($ZrSi_xO_y$), hafnium silicon oxide ($HfSi_xO_y$), hafnium silicon oxynitride ($HfSi_xO_yN_z$), lanthanum sesquioxide ($La_2O_3$), zirconium dioxide ($ZrO_2$), tantalum pentoxide ($Ta_2O_5$), praseodymium oxide ($Pr_2O_3$), or titanium dioxide ($TiO_2$). The material of the work function metal layer 116 is, for instance, TiN, TaC, TaCNO, TaCN, TiAl, TaN, or a combination thereof. The material of the metal gate layer 118 is, for instance, tungsten.

The resistor elements 106 are disposed above the dummy conductive structures 104 and aligned with the dummy conductive structures 104. The resistor elements 106 are, for instance, high-resistance resistors (HIRs), and the material of the resistor elements 106 at this point is, for instance, titanium nitride (TiN). A width W5 of the resistor elements 106 can be greater than or equal to the width W2 of the dummy conductive structures 104. In the present embodiment, the width W5 of the resistor elements 106 is exemplified by being roughly equal to the width W2 of the dummy conductive structures 104.

Moreover, the semiconductor structure 100 can further include at least one of at least one active area AA, at least one conductive structure 120, a doped region 122, a doped region 124, a contact 126, a contact 128, a contact 130, and a dielectric layer 132. The active area AA is located between two adjacent isolation structures 108 in the dense region R2.

The conductive structure 120 is disposed on the substrate 102 between two adjacent isolation structures 108 in the dense region R2. The conductive structure 120 is, for instance, a metal gate structure. Moreover, the conductive structure 120 can have the same structure as the dummy conductive structures 104 which is therefore not repeated herein.

The doped region 122 and the doped region 124 are disposed in the substrate 102 on both sides of the conductive structure 120. The doped region 122 and the doped region 124 can be respectively used as a source or a drain. In the present embodiment, the conductive structure 120, the doped region 122, and the doped region 124 can form a transistor.

The contact 126, the contact 128, and the contact 130 are respectively electrically connected to the conductive structure 120, the doped region 122, and the doped region 124. The material of the contact 126, the contact 128, and the contact 130 is, for instance, tungsten.

Moreover, the dummy conductive structures 104, the resistor elements 106, the conductive structure 120, the contact 126, the contact 128, and the contact 130 can be disposed in the dielectric layer 132. The dielectric layer 132 can be a multi-layer structure. The material of the dielectric layer 132 is, for instance, silicon oxide.

It can be known from the above embodiments that, in the semiconductor structure 100, since each of the isolation structures 108 is located between two adjacent dummy support patterns 110 and each of the dummy conductive structures 104 is disposed on each of the isolation structures 108 and equidistant from the dummy support patterns 110 on both sides, dishing phenomenon to the isolation structures 108 in the resistor region R1 can be prevented to prevent undesired conductive material from remaining in the resistor region R1. Therefore, bridging to the dummy conductive structures 104 in the resistor region R1 and the conductive structure 120 in the dense region R2 can be prevented to improve the electrical performance of the device.

Figure 2:
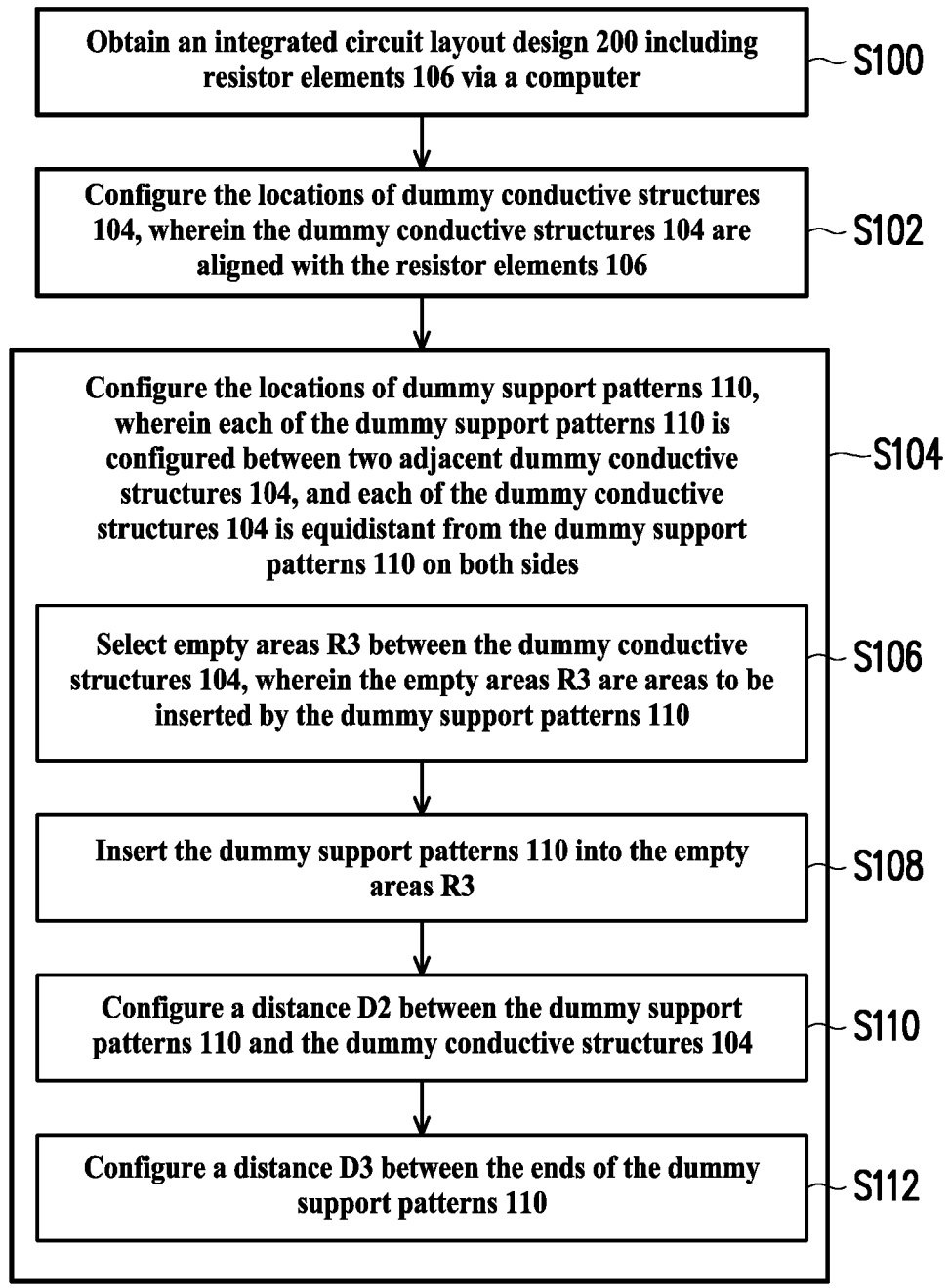
FIG. 2 is a design flowchart of a dummy pattern layout of an embodiment of the invention.
Figure 3A:
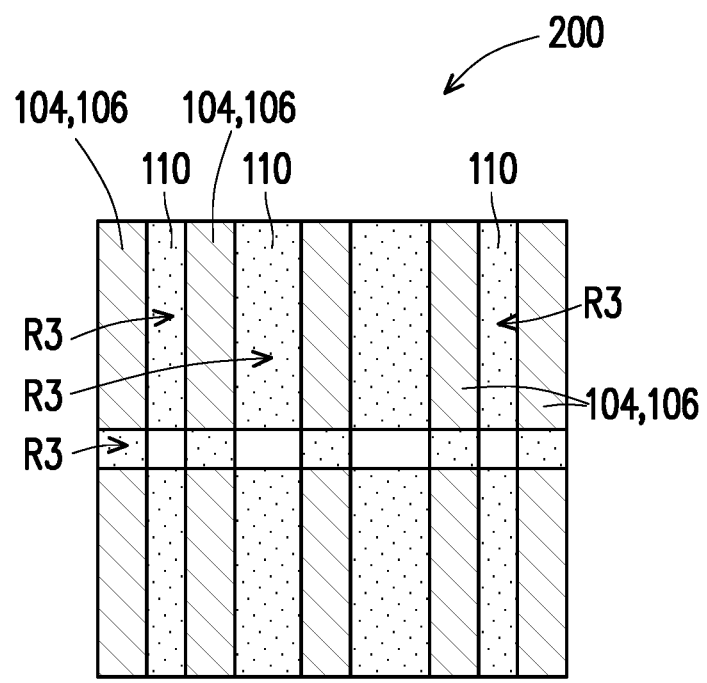
FIG. 3A to FIG. 3C are top views of a design flowchart of a dummy pattern layout of an embodiment of the invention.
Figure 3B:
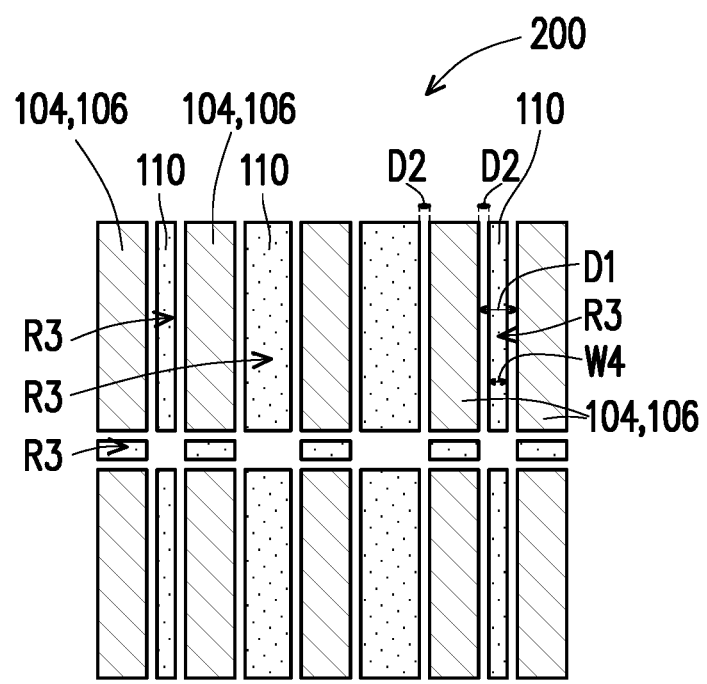
Figure 3C:
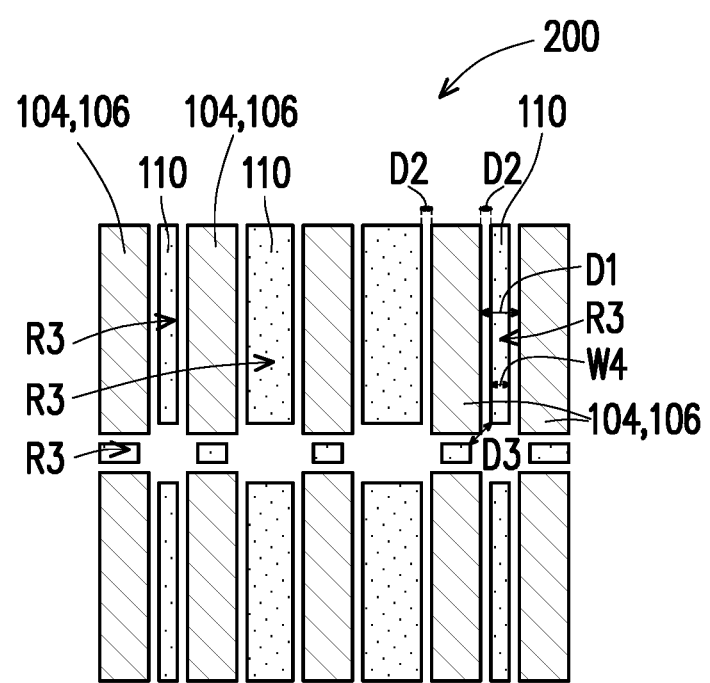

FIG. 2 is a design flowchart of a dummy pattern layout of an embodiment of the invention. FIG. 3A to FIG. 3C are top views of a design flowchart of a dummy pattern layout of an embodiment of the invention.

In the following, the design method of the dummy pattern layout (such as the dummy conductive structures 104 and the dummy support patterns 110) in the semiconductor structure 100 is described via FIG. 2 and FIG. 3A to FIG. 3C. Moreover, the same components in FIG. 2, FIG. 3A to FIG. 3C, and FIG. 1 adopt the same reference numerals and are not repeated herein.

Referring to all of FIG. 2 and FIG. 3A to FIG. 3C, step S100 is performed to obtain an integrated circuit layout design 200 including resistor elements 106 via a computer (FIG. 3A). Step S102 is performed to configure the locations of dummy conductive structures 104, wherein the dummy conductive structures 104 are aligned with the resistor elements 106 (FIG. 3A). Step S104 is performed to configure the locations of dummy support patterns 110, wherein each of the dummy support patterns 110 is configured between two adjacent dummy conductive structures 104, and each of the dummy conductive structures 104 is equidistant from the dummy support patterns 110 on both sides (FIG. 3B and FIG. 3C). That is, the dummy conductive structures 104 can be a same distance D2 from the dummy support patterns 110 on both sides. Moreover, a width W4 of the dummy support patterns 110 is, for instance, less than a distance D1 between two adjacent dummy conductive structures 104. Each of the dummy support patterns 110 is, for instance, located at the central location between two adjacent dummy conductive structures 104.

In the following, the method of configuring the locations of the dummy support patterns 110 (step S104) are described via FIG. 2A to FIG. 2C. In the present embodiment, step S104 can include step S106, step S108, step S110, and step S112.

Referring to both of FIG. 2 and FIG. 3A, step S106 is performed to select empty areas R3 between the dummy conductive structures 104, wherein the empty areas R3 are areas to be inserted by the dummy support patterns 110. Step S108 is performed to insert the dummy support patterns 110 into the empty areas R3.

Referring to both of FIG. 2 and FIG. 3B, step S110 is performed to configure a distance D2 between the dummy support patterns 110 and the dummy conductive structures 104. The distance D2 can be designed by the design rule of the semiconductor process. The distance D2 is, for instance, 20 nm to 50 nm. In an embodiment, the distance D2 can be about 30 nm.

Referring to both FIG. 2 and FIG. 3C, step S112 is performed to configure a distance D3 between the ends of the dummy support patterns 110. The distance D3 can be designed by the design rule of the semiconductor process. The distance D3 is, for instance, 100 nm to 200 nm. In an embodiment, the distance D3 can be about 150 nm.

It can be known from the above embodiments that, in the design method of the dummy pattern layout 200, by configuring each of the dummy support patterns 110 between two adjacent dummy conductive structures 104, each of the isolation structures 108 can be located between two adjacent dummy support patterns 110. Moreover, each of the dummy conductive structures 104 is configured to be equidistant from the dummy support patterns 110 on both sides. Accordingly, dishing phenomenon to the isolation structures 108 in the resistor region R1 can be prevented to prevent undesired conductive material from remaining in the resistor region R1.

Based on the above, via the semiconductor structure and the design method of the dummy pattern layout of the embodiments, undesired conductive material can be prevented from remaining in the resistor region (low pattern density region) to prevent bridging to the dummy conductive structures in the resistor region and the conductive structures in the dense region such that the electrical performance of the device can be improved.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A design method of a dummy pattern layout, comprising:
    obtaining an integrated circuit layout design comprising resistor elements via a computer;
    configuring locations of dummy conductive structures, wherein the dummy conductive structures are aligned with the resistor elements, and a width of each of the resistor elements is equal to a width of each of the dummy conductive structures; and
    configuring locations of dummy support patterns, wherein each of the dummy support patterns is configured between two adjacent dummy conductive structures, and each of the dummy conductive structures is equidistant from the dummy support patterns on both sides.

2. The design method of the dummy pattern layout of claim 1, wherein a method of configuring the locations of the dummy support patterns comprises:
    selecting empty areas between the dummy conductive structures, wherein the empty areas are areas to be inserted by the dummy support patterns;
    inserting the dummy support patterns into the empty areas;
    configuring a distance between the dummy support patterns and the dummy conductive structures; and
    configuring a distance between ends of the dummy support patterns.

3. The design method of the dummy pattern layout of claim 1, wherein a width of each of the dummy support patterns is less than a distance between two adjacent dummy conductive structures.

4. The design method of the dummy pattern layout of claim 1, wherein each of the dummy support patterns is located at a central location between two adjacent dummy conductive structures.

5. The design method of the dummy pattern layout of claim 1, wherein the dummy support patterns are a portion of the substrate.

6. The design method of the dummy pattern layout of claim 1, wherein the dummy conductive structures comprise dummy metal gate structures or dummy contacts.

7. The design method of the dummy pattern layout of claim 1, wherein the resistor elements comprise high-resistance resistors.

* * * * *